United States Patent
Cappello et al.

(10) Patent No.: US 11,312,002 B2
(45) Date of Patent: Apr. 26, 2022

(54) APPARATUS CONTROL SYSTEM AND METHOD

(71) Applicant: Sony Interactive Entertainment Inc., Tokyo (JP)

(72) Inventors: Fabio Cappello, London (GB); Jason Gordon Doig, London (GB); Michael Eder, London (GB); Rajeev Gupta, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 262 days.

(21) Appl. No.: 16/390,303

(22) Filed: Apr. 22, 2019

(65) Prior Publication Data
US 2019/0329402 A1    Oct. 31, 2019

(30) Foreign Application Priority Data
Apr. 27, 2018    (GB) .................................... 1806913

(51) Int. Cl.
| | |
|---|---|
| *B25J 9/16* | (2006.01) |
| *B25J 9/00* | (2006.01) |
| *A63H 30/04* | (2006.01) |
| *B25J 15/00* | (2006.01) |
| *B25J 15/06* | (2006.01) |
| *G06N 3/00* | (2006.01) |

(52) U.S. Cl.
CPC ............ *B25J 9/0003* (2013.01); *A63H 30/04* (2013.01); *B25J 9/0087* (2013.01); *B25J 9/1679* (2013.01); *B25J 9/1697* (2013.01); *B25J 15/0004* (2013.01); *B25J 15/06* (2013.01); *G06N 3/008* (2013.01)

(58) Field of Classification Search
USPC .................................................. 700/245–264
See application file for complete search history.

(56) References Cited

U.S. PATENT DOCUMENTS

| | | | | |
|---|---|---|---|---|
| 6,636,781 B1* | 10/2003 | Shen | ....................... | B08B 9/045 |
| | | | | 318/568.11 |
| 8,244,402 B2* | 8/2012 | Wells | ..................... | H04N 5/332 |
| | | | | 700/250 |

(Continued)

FOREIGN PATENT DOCUMENTS

| | | |
|---|---|---|
| EP | 0996046 A1 | 4/2000 |
| EP | 3560566 A1 | 10/2019 |
| GB | 2287045 A1 | 9/1995 |

OTHER PUBLICATIONS

Combined Search and Examination Report for corresponding GB Application No. 1806913.8, 4 pages, dated Oct. 25, 2018.

(Continued)

*Primary Examiner* — Jonathan L Sample
(74) *Attorney, Agent, or Firm* — Matthew B. Dernier, Esq.

(57) ABSTRACT

A system for controlling a configurable apparatus includes a configuration identification unit operable to identify a preferred configuration of the apparatus in response to media content to be provided to a user, and a configuration modification unit operable to modify the configuration of the apparatus in dependence upon the identified preferred configuration, where different configurations of the apparatus correspond to the shapes of different objects relating to the media content.

13 Claims, 11 Drawing Sheets

(56) References Cited

U.S. PATENT DOCUMENTS

| | | | |
|---|---|---|---|
| 8,414,349 B2* | 4/2013 | Boman | A63F 13/235 |
| | | | 446/268 |
| 9,703,896 B2* | 7/2017 | Zhang | B33Y 50/00 |
| 10,093,488 B2* | 10/2018 | Brandwijk | A63H 33/042 |
| 10,105,592 B2* | 10/2018 | Brandwijk | A63F 13/00 |
| 2006/0155388 A1* | 7/2006 | Pietrzyk | A63H 33/046 |
| | | | 700/2 |
| 2008/0009970 A1* | 1/2008 | Bruemmer | G05D 1/0088 |
| | | | 700/245 |
| 2010/0274902 A1* | 10/2010 | Penman | A63F 13/28 |
| | | | 709/227 |
| 2013/0123987 A1* | 5/2013 | Kase | A63H 30/04 |
| | | | 700/259 |
| 2015/0290808 A1* | 10/2015 | Renkis | H04L 67/125 |
| | | | 700/257 |
| 2015/0306763 A1* | 10/2015 | Meier | B25J 19/023 |
| | | | 700/248 |
| 2016/0184993 A1* | 6/2016 | Brandwijk | B25J 9/1617 |
| | | | 700/258 |
| 2018/0079081 A1* | 3/2018 | Chen | G06Q 10/087 |
| 2018/0129276 A1* | 5/2018 | Nguyen | G09B 9/00 |
| 2018/0297215 A1* | 10/2018 | Oberlin | B25J 19/023 |
| 2018/0370025 A1* | 12/2018 | Didey | A63H 11/00 |
| 2020/0050342 A1* | 2/2020 | Lee | G06T 13/20 |

OTHER PUBLICATIONS

Examination Report for corresponding GB Application No. 1806913.8, 4 pages, dated Feb. 18, 2021.

Extended European Search Report for corresponding EP Application No. 19152739.9, 12 pages, dated Apr. 17, 2019.

Phillip Schoessler, et al. "Kinetic Blocks—Actuated Constructive Assembly for Interaction and Display" proceedings of the 28th Annual ACM Symposium on User Interface Software an Technology, pp. 341-349 Nov. 5, 2015.

Javier Alonso-Mora, et al., "Image and animation display with multiple mobile robots", International Journal of Robotics Research., vol. 31, No. 6, pp. 753-773, May 1, 2012.

Examination Report for corresponding GB Application No. 1806913.8, 4 pages, dated Sep. 8, 2021.

* cited by examiner

APPARATUS CONTROL SYSTEM AND METHOD

BACKGROUND OF THE INVENTION

Field of the Invention

This disclosure relates to an apparatus control system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the ability to provide users with increasingly high-quality content, such as high-resolution video and gameplay, the provision of more immersive user experiences has become more desirable. This is particularly true in virtual reality (VR) or augmented reality (AR) applications, for example, although such an objective is also considered with respect to content that is not provided to a user via a head-mountable display (HMD).

While higher-quality and more responsive image and audio content can contribute to a sense of immersion for a user, the use of different peripherals may also be a determining factor. For instance, a peripheral that is a poor representation of an object that is displayed may cause a break in the user's sense of immersion—an example of this is the use of a mouse and keyboard to pick up a cup in a virtual environment. By using such an input, the user is made very aware that they are not present in the virtual environment and interacting with the displayed object.

One method for addressing this problem has been to provide specialised peripherals, or additional housings that may be used in conjunction with a standard peripheral that can be used to modify the overall shape. For instance, specialised steering wheel or gun-shaped controllers have been provided in existing arrangements, and clip-on attachments for simulating steering wheels or golf clubs (for example) are also known.

These may be advantageous in that the sense of immersion experienced by using the peripherals may be increased, although there are numerous disadvantages in that the number of peripherals or attachments increases directly with the number of different objects that the user would wish to handle.

And alternative approach that has been taken is that of attempting to eliminate the use of peripherals altogether. By using video-based tracking or other suitable methods, users may be able to input commands to a processing device by using gestures. This means that more intuitive inputs may be provided by the user, as the inputs may be designed so as to correspond more closely to the expected interactions with objects in the virtual environment.

It is in the context of the above problems that the present invention arises.

SUMMARY OF THE INVENTION

This disclosure is defined by claim 1.
Further respective aspects and features of the disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
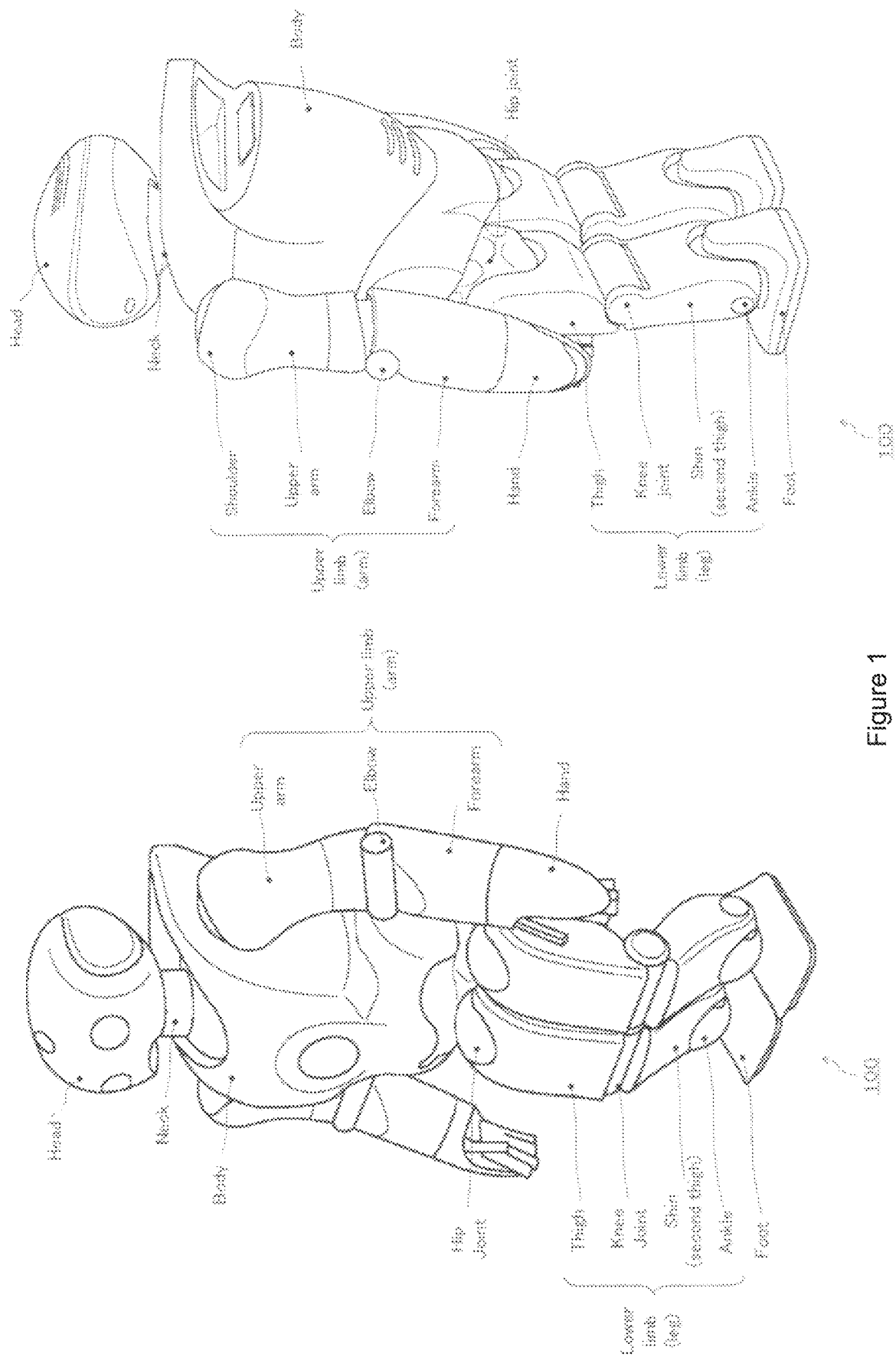
FIG. 1 is a schematic diagram showing front and rear elevations of a robot, in accordance with embodiments of the present invention.

Referring now to the drawings, wherein like reference numerals designate identical or corresponding parts throughout the several views, a robot platform 100 for implementing embodiments of the present invention may take the form of any suitable robotic device, or simulation of a robotic device, as applicable.

The robot platform may have any suitable physical features. Hence movement, where required, may be achieved by wheels, tracks, articulated limbs, internal mass displacement or any other suitable means. Manipulation, where required, maybe achieved by one or more of a mechanical hand, pincer or any other hooking or gripping system, such as a suction or electromagnetic attachment mechanism or a hook or clip, and any further optional articulation such as one or more jointed arms. Vision, where required, may be achieved by optical camera and/or infra-red camera/detector, mounted on the robot and/or located within the environment navigated by the robot. Other situational awareness systems such as ultrasound echolocation, or detection of metal tracks and/or electrically charged tracks, and proximity systems such as whiskers coupled to sensors, or pressure pads, may also be considered. Control of the robot may be provided by running suitable software instructions on a processor of the robot and/or a processor of a remote computer communicating with the robot, for example via a wireless protocol.

FIG. 1 illustrates front and rear views of an exemplary legged locomotive robot platform 100. As shown, the robot includes a body, head, right and left upper limbs, and right and left lower limbs for legged movement. A control unit 80 (not shown in FIG. 1) within the body provides a control system for the robot.

Each of the right and left lower limbs includes a thigh, knee joint, second thigh (calf/shin), ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Meanwhile, the head is coupled by a neck joint near to the upper end centre of the trunk.

Figure 2:
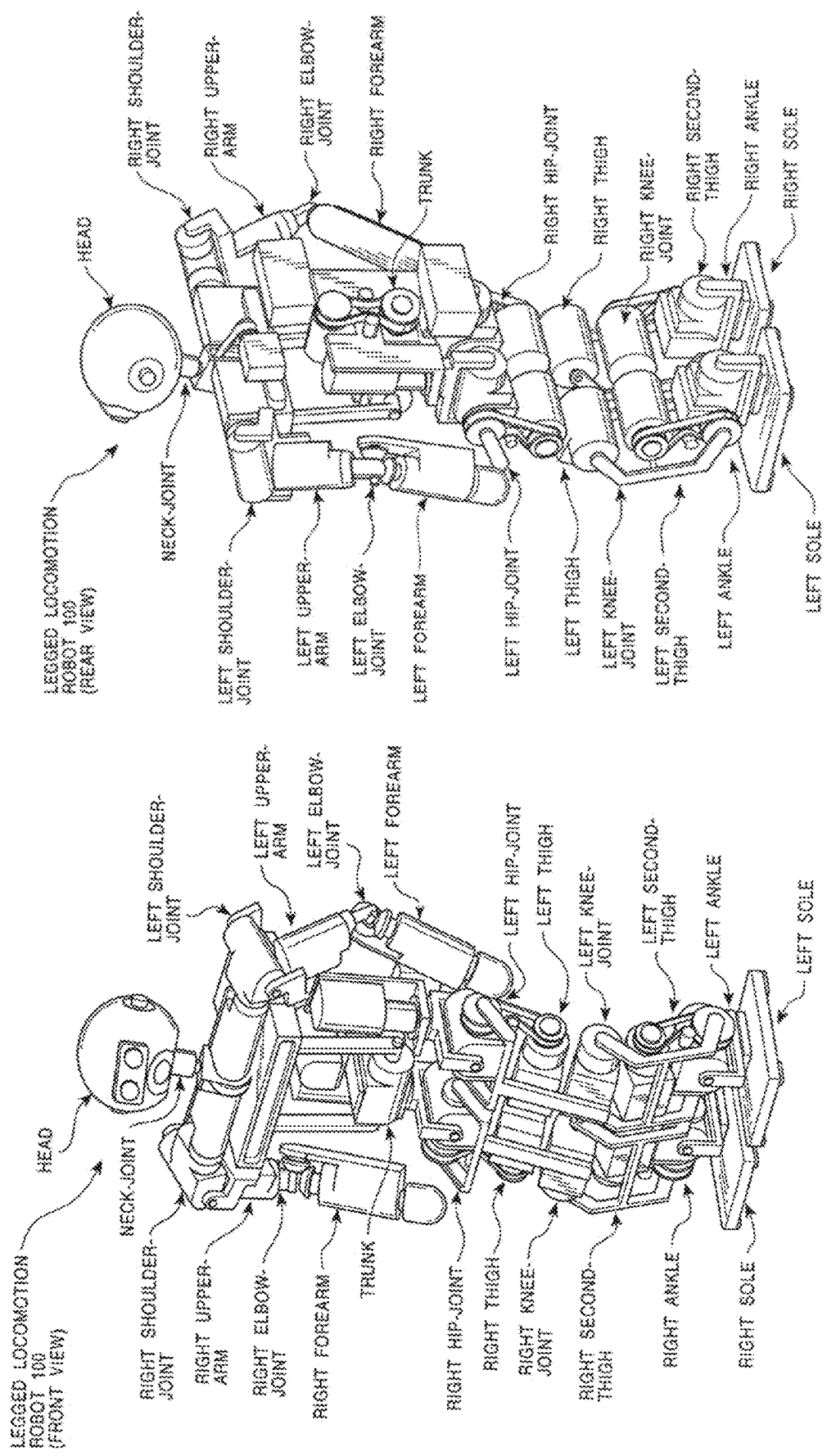
FIG. 2 is a schematic diagram showing front and rear elevations of points of articulation of a robot, in accordance with embodiments of the present invention.

FIG. 2 illustrates front and rear views of the robot, showing its points of articulation (other than the hands).

Figure 3:
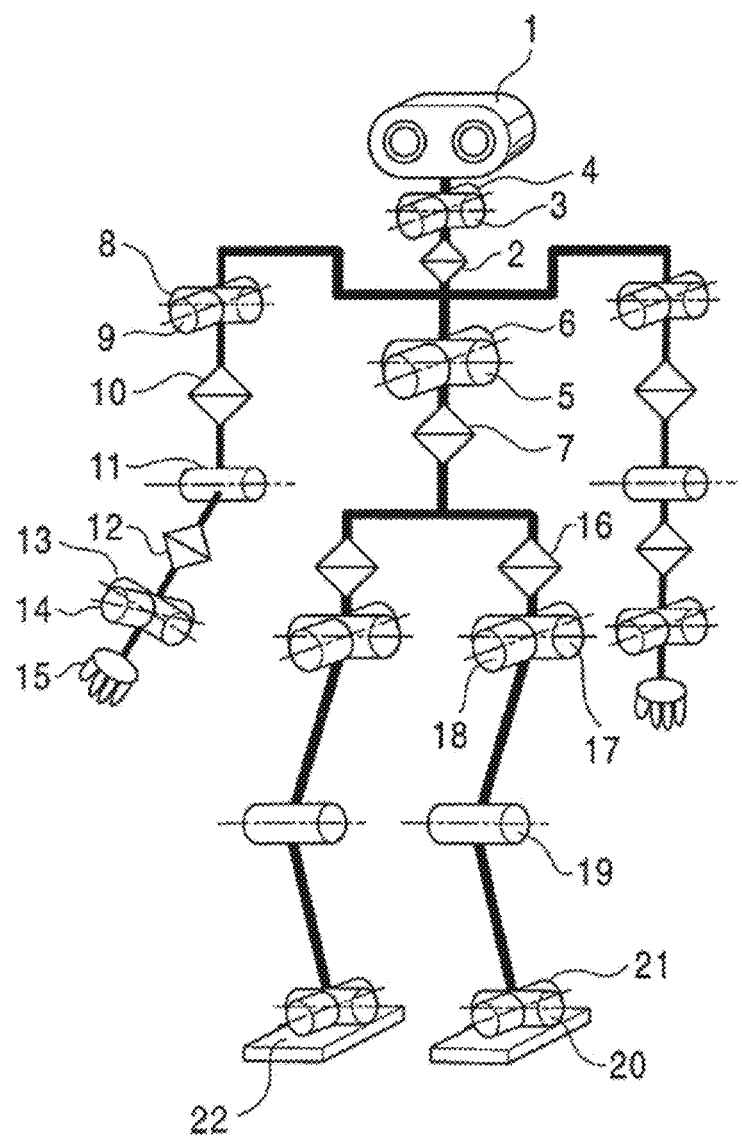
FIG. 3 is a schematic diagram illustrating degrees of freedom at respective points of articulation of a robot, in accordance with embodiments of the present invention.

FIG. 3 then illustrates the degrees of freedom available for each point of articulation.

Referring to these Figures, a neck joint for supporting the head 1 has 3 degrees of freedom: a neck-joint yaw-axis 2, a neck-joint pitch-axis 3, and a neck-joint roll-axis 4. Meanwhile each arm has 7 degrees of freedom; a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. Typically the hand 15 also has a multi-joints multi-degrees-of-freedom structure including a plurality of fingers. However, these are omitted for simplicity of explanation. The trunk has 3 degrees of freedom; a trunk pitch-axis 5, a trunk roll-axis 6, and a trunk yaw-axis 7. Each leg constituting the lower limbs has 6 degrees of freedom; a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In the exemplary robot platform, the cross point between the hip-joint pitch-axis 17 and the hip-joint roll-axis 18 defines a hip-joint location of the legged walking robot 100 according to the embodiment. Again for simplicity it is assumed that the foot itself has no degrees of freedom, but of course this is non-limiting. As a result the exemplary robot 100 has 32 (=3+7×2+3+6×2) degrees of freedom in total. It will be appreciated however that this is merely exemplary, and other robot platforms may have more or fewer degrees of freedom.

Each degree of freedom of the exemplary legged locomotive robot platform 100 is implemented by using an actuator. For example, a small AC servo actuator that is directly coupled to a gear and that houses a one-chip servo-system may be used, although any suitable actuator may be considered, such as a linear servo, electroactive polymer muscle, pneumatic, piezoelectric, or the like.

It will be appreciated that any desired action that the robot platform is capable of may be implemented by control signals issued by a control system to one or more of the actuators of the robot (or to simulated actuators in a simulation, as applicable), to adjust the pose of the robot within its available degrees of freedom.

Figure 4:
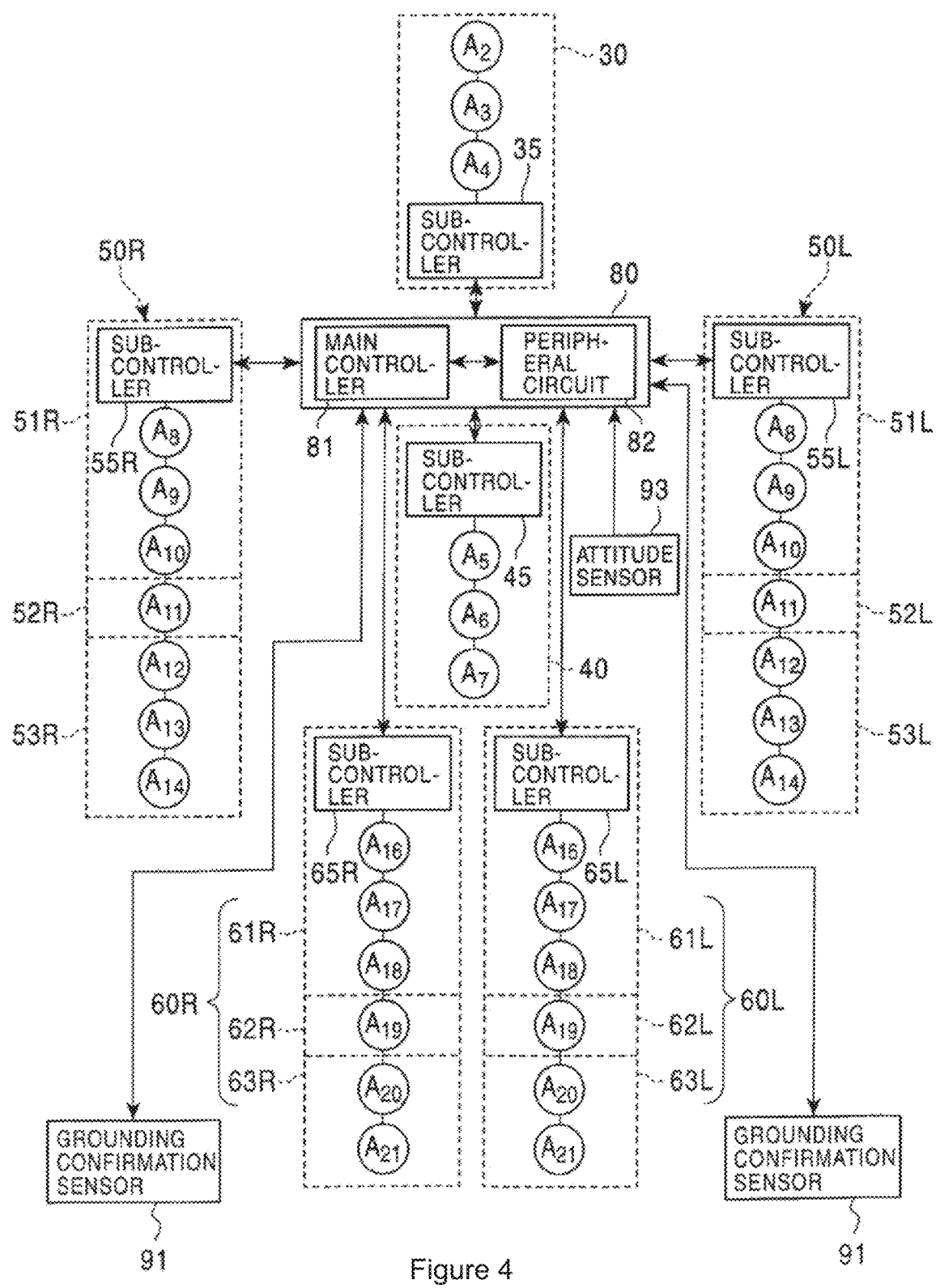
FIG. 4 is a schematic diagram of a control system for a robot, in accordance with embodiments of the present invention.

FIG. 4 schematically illustrates an exemplary control system for the robot platform 100.

A control unit 80 operates to co-ordinate the overall motion/actions of the robot. The control unit 80 has a main control unit 81 including main circuit components (not shown) such as a CPU (central processing unit) and a memory, and typically a periphery circuit 82 including an interface (not shown) for sending and receiving data and/or commands to and from a power supply circuit (not shown) and each component of the robot. The control unit may comprise a communication interface and communication device for receiving data and/or commands by remote-controlling. The control unit can be located anywhere suitable within the robot.

As shown in FIG. 4, the robot has logical units 30 (head), 40 (torso), and 50R/L and 60R/L each representing the corresponding one of four human limbs. The degrees-of-freedom of the robot 100 shown in FIG. 3 are implemented by the corresponding actuator within each unit. Hence the head unit 30 has a neck-joint yaw-axis actuator A2, a neck-joint pitch-axis actuator A3, and a neck-joint roll-axis actuator A4 disposed therein for representing the neck-joint yaw-axis 2, the neck-joint pitch-axis 3, and the neck-joint roll-axis 4, respectively. Meanwhile the trunk unit 40 has a trunk pitch-axis actuator A5, a trunk roll-axis actuator A6, and a trunk yaw-axis actuator A7 disposed therein for representing the trunk pitch-axis 5, the trunk roll-axis 6, and the trunk yaw-axis 7, respectively. Similarly the arm units 50R/L are broken down into upper-arm units 51R/L, elbow-joint units 52R/L, and forearm units 53R/L. Each of the arm units 50R/L has a shoulder-joint pitch-axis actuator A8, a shoulder-joint roll-axis actuator A9, an upper-arm yaw-axis actuator A10, an elbow-joint pitch-axis actuator A11, an elbow-joint roll-axis actuator A12, a wrist-joint pitch-axis actuator A13, and a wrist-joint roll-axis actuator A14 disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively. Finally the leg units 60R/L are broken down into thigh units 61R/L, knee units 62R/L, and second-thigh units 63R/L. Each of the leg units 60 R/L has a hip-joint yaw-axis actuator A16, a hip-joint pitch-axis actuator A17, a hip-joint roll-axis actuator A18, a knee-joint pitch-axis actuator A19, an ankle-joint pitch-axis actuator A20, and an ankle-joint roll-axis actuator A21 disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively. Optionally the head unit 30, the trunk unit 40, the arm units 50, and the leg units 60 may have sub-controllers 35, 45, 55, and 65 for driving the corresponding actuators disposed therein.

Hence by issuing appropriate commands, the main controller (81) can control the driving of the joint actuators included in the robot 100 to implement the desired action. For example, the controller may implement a walking action by implementing successive phases, as follows:

(1) Single support phase (left leg) with the right leg off the walking surface;

(2) Double support phase with the right foot touching the walking surface;

(3) Single support phase (right leg) with the left leg off the walking surface; and (4) Double support phase with the left foot touching the walking surface.

Each phase in turn comprises the control of a plurality of actuators, both within the relevant leg and potentially elsewhere in the robot, for example moving the opposing arm and/or attitude of the torso to maintain the centre of gravity of the robot over the supporting foot or feet.

Optionally, to detect the manner and/or extent of a physical interaction with an object and/or the environment, physical sensors may be provided.

Hence in the exemplary robot, the feet 22 have grounding detection sensors 91 and 92 (e.g. a proximity sensor or microswitch) for detecting the grounding of the feet 22 mounted on legs 60R and 60L respectively, and the torso is provided with an attitude sensor 93 (e.g. an acceleration sensor and/or a gyro-sensor) for measuring the trunk attitude. Outputs of the grounding detection sensors 91 and 92 are used to determine whether each of the right and left legs is in a standing state or a swinging state during the walking action, whilst an output of the attitude sensor 93 is used to detect an inclination and an attitude of the trunk. Other sensors may also be provided, for example on a gripping component of the robot, to detect that an object is being held.

The robot may also be equipped with sensors to provide additional senses. Hence for example the robot may be equipped with one or more cameras, enabling the control unit (or a remote system to which sensor-based data is sent) to recognise a user of the robot, or a target object for retrieval. Similarly one or more microphones may be provided to enable voice control or interaction by a user. Any other suitable sensor may be provided, according to the robot's intended purpose. For example, a security robot intended to patrol a property may include heat and smoke sensors, and GPS.

Hence more generally, a robot platform may comprise any suitable form factor and comprise those degrees of freedom necessary to perform an intended task or tasks, achieved by the use of corresponding actuators that respond to control signals from a local or remote controller that in turn operates under suitable software instruction to generate a series of control signals corresponding to a performance of the intended task(s).

In order to provide software instruction to generate such control signals, a robot software development system may be provided for developing control sequences for desired actions, and/or for developing decision making logic to enable the robot control system to respond to user commands and/or environmental features.

As part of this development system, a virtual robot (i.e. a simulation) may be used in order to simplify the process of implementing test software (for example by avoiding the need to embed test software within robot hardware that may not have simple user-serviceable parts, or to simulate an environment or action where a mistake in the software could damage a real robot). The virtual robot may be characterised by the dimensions and degrees of freedom of the robot, etc., and an interpreter or API operable to respond to control signals to adjust the state of the virtual robot accordingly.

Control software and/or scripts to use with such software may then be developed using, and to use, any suitable techniques, including rule based/procedural methods, and/or machine learning/neural network based methods.

Figure 5:
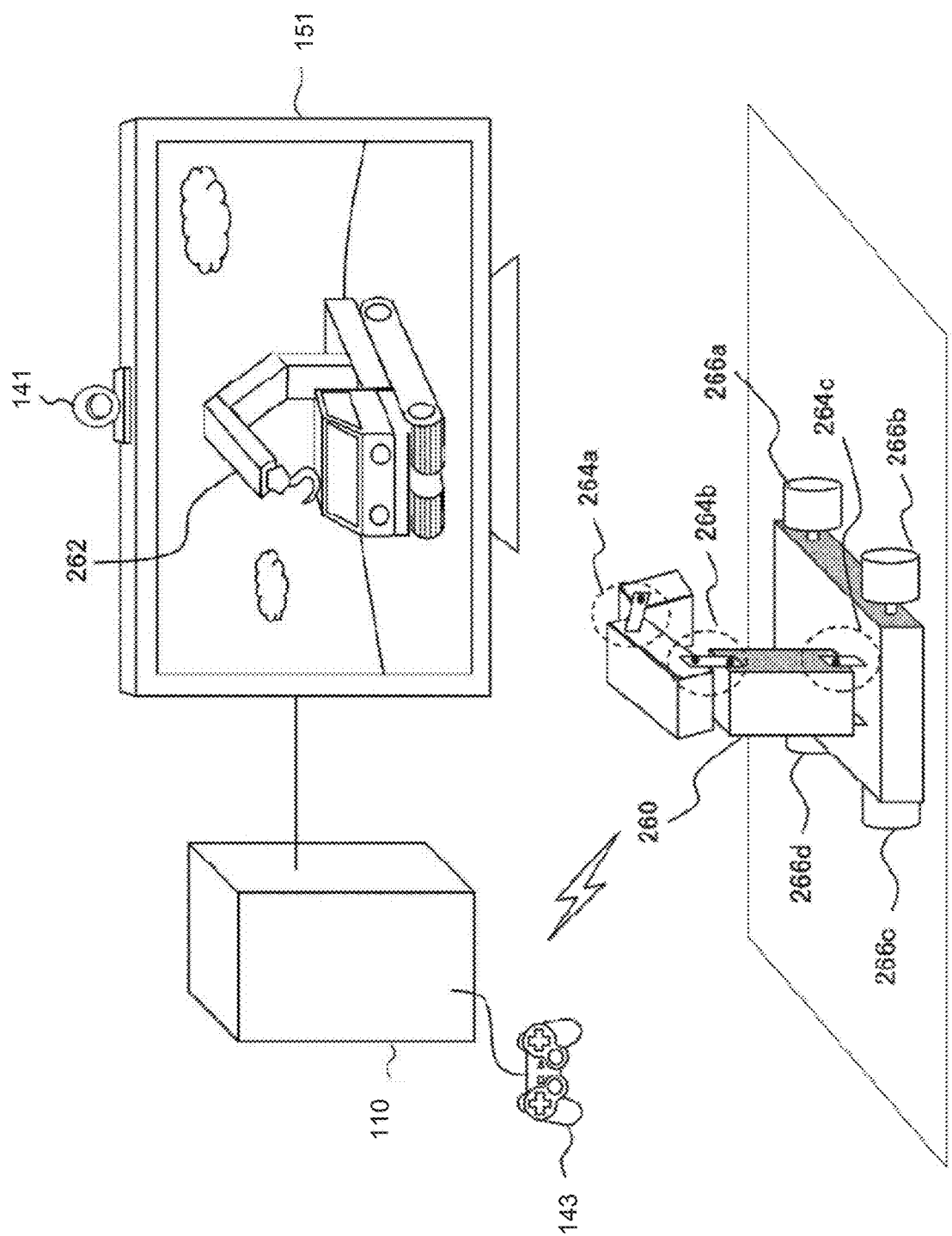
FIG. 5 is a schematic diagram of an interactive robot system in accordance with embodiments of the present invention.

Referring to FIG. 5, in an exemplary usage scenario a (toy) real robot crane 260 and a corresponding simulation (virtual robot crane 262) interact for entertainment purposes, for example mirroring each other's actions or behaving in a complementary manner, and/or using sensor data from the real or virtual robot to control actions of the other. The virtual robot may be graphically embellished compared to the real robot, for example having a face, or resembling an object or creature only approximated by the real robot.

In this example, the robot platform 260 has motorised wheels 266a-d and one articulated arm with actuators 264a-c. However it will be appreciated that any suitable form factor may be chosen, such as for example the humanoid robot 100 of FIG. 1, or a dog-shaped robot (not shown) or a spheroidal robot (not shown).

In FIG. 5, control of both the virtual and real robots is performed by a general purpose computer (110) operating under suitable software instructions, such as the Sony® PlayStation 4®. A user can interact with the PlayStation and hence optionally indirectly interact with one or both of the real and virtual robots using any suitable interface, such as a videogame controller 143. The PlayStation can detect the state of the real robot by receiving telemetry and other status data from the robot, and/or from analysis of an image of the real robot captured by a video camera 141. Alternatively or in addition the PlayStation can assume the state of the real robot based on expected outcomes of the commands sent to it. Hence for example, the PlayStation may analyse captured images of the real robot in expected final poses to determine its positon and orientation, but assume the state of the robot during intermediate states such as transitions between poses.

In the example scenario, the user provides inputs to control the real robot via the PlayStation (for example indicating an amount and direction of travel with one joystick, and a vertical and horizontal position of the arm end with another joystick). These inputs are interpreted by the PlayStation into control signals for the robot. Meanwhile the virtual simulation of the robot may also be controlled in a corresponding or complementary manner using the simulation technique described above, according to the mode of play.

Alternatively or in addition, the user may directly control the real robot via its own interface or by direct manipulation, and the state of the robot may be detected by the PlayStation (e.g. via image analysis and/or telemetry data from the robot as described previously) and used to set a corresponding state of the virtual robot.

It will be appreciated that the virtual robot may not be displayed at all, but may merely act as a proxy for the real robot within a virtual environment. Hence for example the image of the real robot may be extracted from a captured video image and embedded within a generated virtual environment in an augmented reality application, and then actions of the real robot can be made to appear to have an effect in the virtual environment by virtue of those interactions occurring with a corresponding virtual robot in the environment mirroring the state of the real robot.

Alternatively, a virtual robot may not be used at all, and the PlayStation may simply provide control and/or state analysis for the real robot. Hence for example the PlayStation may monitor the robot via the camera, and cause it to pick up a ball or other target object placed within the camera's field of view by the user.

Hence more generally, a robot platform may interact with a general purpose computer such as the Sony® PlayStation 4® to obtain a series of control signals relating to setting a state of the robot, for the purposes of control by a user and/or control by the PlayStation to achieve a predetermined task or goal. Optionally the state, task or goal may be at least in part defined within or in response to a virtual environment, and may make use of a simulation of the robot.

While the above description has been made with reference to purpose-made robots with a fixed form (such as a humanoid robot or the toy of FIG. 5), it is considered advantageous that a robot may be able to adapt its shape or configuration so as to be able to mimic or approximate a desired object shape. This may enable a greater range of interaction than an embodiment in which only a texture is mimicked, as the user is able to interact more freely with the object without a break in immersion.

One advantage of this is in that the robot may be able to act as a peripheral device that may assume a form that is appropriate for media content that is being provided to a user, for example by providing a peripheral that may be handled (such as being gripped in different positions) as if it were an object in media content.

Figure 6:
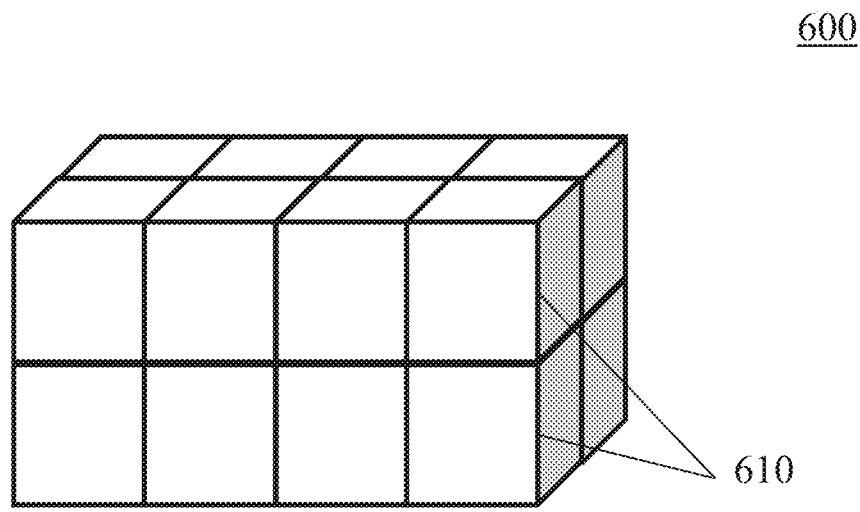
FIG. 6 schematically illustrates a simplified apparatus comprising a plurality of components.

A simplified apparatus that may be suitable for such a purpose is shown in FIG. 6; sixteen cubic components 610 are arranged to form a cuboid 600. Each of these cubic components 600 may move (or be moved) to a different position in order to generate a different overall shape of the apparatus. These simplified cubic components may provide functionality in line with those examples defined above; for example, they may be connected with actuators or the like that act in the same manner as the joints of the humanoid robots. The use of cubes in this Figure is intended to enhance the clarity of the description; any suitable component shape may be used, and different components may have different shapes. For example, components may be wedge shaped (e.g. similar to a cube cut diagonally) (not shown). Such components may be connected via their smaller faces using rotating actuators. This allows successive components fold or straighten with respect to each other, so that predetermined rotations of respective faces cause the robot to curl up into different configurations.

While each of the wedges or cubes may be considered to be a separate device or robot, in some cases only a single one (or other subset) may be provided with sufficient functionality and processing features so as to be considered a robot. In such embodiments, the apparatus as a whole may be considered to be a single robot with a number of movable components (in this case, the wedges or cubes) for example. Alternatively, each of the wedges or cubes may possess sufficient capabilities to be considered a robot in their own right and the apparatus may instead be considered to be a composition of a plurality of robots. Of course, embodiments in which not all the wedges or cubes are considered to be robots, but a plurality are, are also considered.

Referring now only to cubes for simplicity of explanation, the cubes may be affixed to one another in any suitable manner; generally the connections between the cubes are reversible or non-permanent, although it is possible that the cubes may be provided in groups that are fixed in a permanent fashion. An example of a non-permanent fixing method is the use of electromagnetism; at least some of the cubes may be provided with electromagnetic force generating units that enable the cubes to be reversibly attached to one another. Alternatively, or in addition, a number of cubes in the arrangement may be provided with actuators that may be used to generate motion with one or more degrees of freedom between cubes. For example, a number of cubes may each comprise universal joints, and these may be controlled by actuators operating in respective axes.

Figure 7:
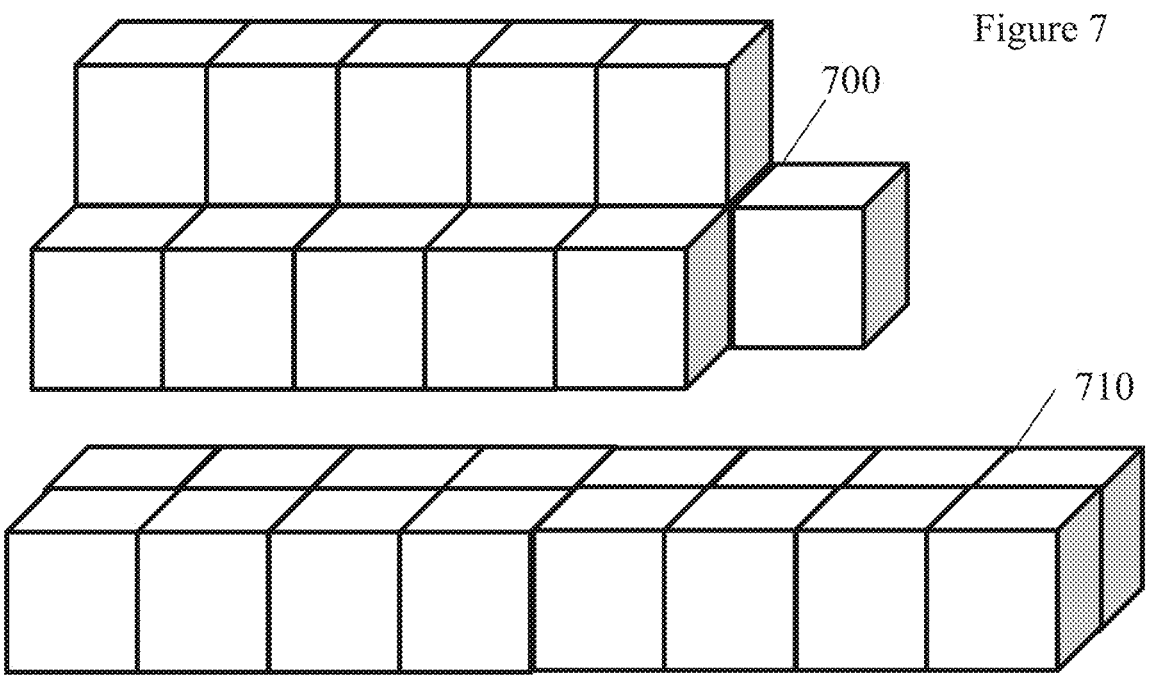
FIG. 7 schematically illustrates possible alternative configurations of the apparatus of FIG. 6.

FIG. 7 schematically illustrates two alternative configurations of the arrangement 600 of FIG. 6; the configuration 700 and the configuration 710 each contain the same number of components (cubes 610) arranged in a different order to generate a different overall shape. As noted above, such configurations may be obtained by using actuators or electromagnetic forces to move and/or connect the cubes 610.

Figure 8:
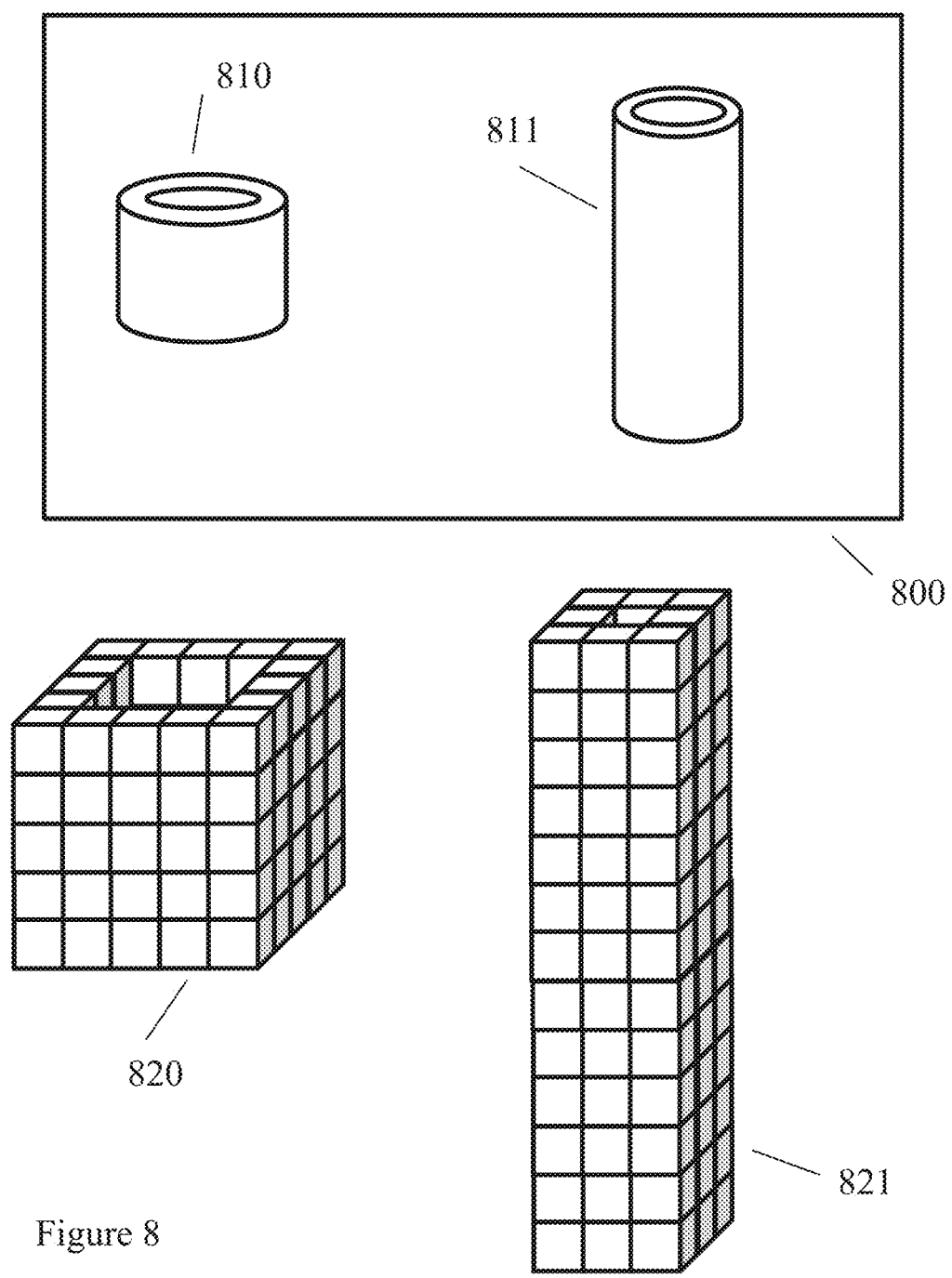
FIG. 8 schematically illustrates a display and corresponding apparatus configurations.

FIG. 8 schematically illustrates an example in which the configuration of the arrangement is related to media content presented to the viewer. While this example relates to visual content displayed on a screen 800, it could of course relate to objects described by audio content or the like. The visual content may comprise pre-recorded video content or images of a video game, for example. In some embodiments, the screen 800 could be a part of a head-mountable display system used to display content to a user.

In this example, two containers are shown—a shorter, wider container 810 (such as a mug) and a taller, narrower container 811 (such as a glass). If a user is seeking to interact with these objects, it may improve their sense of immersion if the shape of the arrangement is reconfigured to match (or at least approximate) the shape of one or both of the objects 810 and 811.

The apparatus 820 is configured so as to approximate the shape of the object 810, while the apparatus 821 is configured so as to approximate the shape of the object 811. Assuming that only the bottom layer does not have the hole (corresponding to the internal volume of the containers), the two arrangements 820 and 821 have the same number of cubes; in view of this, it is considered that the arrangements 820 and 821 may be the same apparatus in different configurations. For example, the apparatus may select the configuration that most closely corresponds to the object in which a user attempts to interact with.

In order for an appropriate configuration to be selected, information about the object to be approximated must be obtained. This could be obtained using any suitable method or combination of methods; a number of examples are provided below.

In some examples, information about appropriate configurations is included as metadata with the content being provided to the user. For example, a movie may have additional information provided that identifies either an exact configuration of components, or information about a target configuration (such as information describing a model of the target or preferred configuration). The latter of these may provide greater flexibility in view of different users having different components, although it would result in a processing burden on the control device in order to determine how best to obtain the target configuration from the available components.

Alternatively, or in addition, information may be generated from rendering data for a game or the like. For example, a mesh that is used in rendering an image of an object may be examined in order to identify an appropriate configuration of the apparatus that could be used to approximate that object.

Alternatively, or in addition, image processing techniques may be used to identify size and shape characteristics of objects being displayed as a part of a virtual environment. This information can then be used to generate configuration information for the apparatus that may be used to simulate the displayed objects.

Of course, the configurations shown in FIG. 8 would likely be considered to be poor approximations of the objects being displayed—it is not possible to effectively simulate a cylinder with cubes that are such a large size relative to the cylinder. In view of this, smaller components may be used so as to allow a greater resolution approximation to be generated. Alternatively, or in addition, component shapes other than cubes may be used so as to enable the approximation of different shapes using the same size of component.

In a number of embodiments, it may be possible for the apparatus to vary the number of components that are being used. For example, when simulating a large object it may be useful to have a large number of components, while when simulating a smaller object it may be useful to use a smaller number of components so as to more closely resemble the target shape and size. This effectively means that the number of components may scale with the object size. Of course, in embodiments in which components of different sizes and shapes are available the number of components used may vary when making selections of which components are appropriate for use in approximating an object.

Such a feature may be implemented in a number of ways. For example, in a case in which electromagnetic forces are used to connect the components it is possible that no connection is made with components that are not to be used (or connections are ended with those components, if already connected). Alternatively, mechanical connections and/or actuators may be used to physically connect and/or disconnect components as desired without user input.

The components themselves may be provided with a range of different capabilities or functionality so as to better approximate objects related to media content provided to a user. A number of non-limiting examples are described below.

In some embodiments, the faces of one or more components may be provided with tactile components that may be used to provide different sensations to a user. In one example, this may include surfaces made with different materials so as to provide different textures. In other examples, movable components may be provided so as to enable different textures or shapes (on a smaller scale than the shapes generated by the components themselves) to be presented to a user.

In some embodiments, the faces may be rotatable or reversible; this may be combined with different textures so as to be able to generate a more varied user experience with a reduced number of components. For example, two the internal and external faces of a surface may be different, and by flipping (reversing) the surface a selection of which face is presented to a viewer may be made.

In some embodiments, the faces may be able to be heated or cooled so as to generate temperature sensations. For example, the arrangement could simulate particular materials in such a manner—such as applying a cooling when simulating a metal object. This could be provided by heating or cooling elements within the components, for example, such as a resistive heating element or a thermoelectric cooling element.

In some embodiments the components may be able to modify their size and/or shape. This could be achieved by the use of actuators within the components, operable to move or resize edges or surfaces of the components, for example. Alternatively, or in addition, inflatable elements (for example, filled or fillable with air or any other suitable fluid) may be incorporated into the components—these may also assist in modifying the apparent hardness of the apparatus when being handled by a user.

The use of components that are able to modify their size and/or shape may be advantageous in that a reduced number of components may need to be provided as several objects may be approximated using the same component(s). For example, rather than using the configurable cubes in FIG. 8, a single cylindrical object may be provided that is operable to modify at least its diameter; an expandable shell with an inflatable interior could be provided, for example. This is discussed with reference to FIG. 9.

Figure 9:
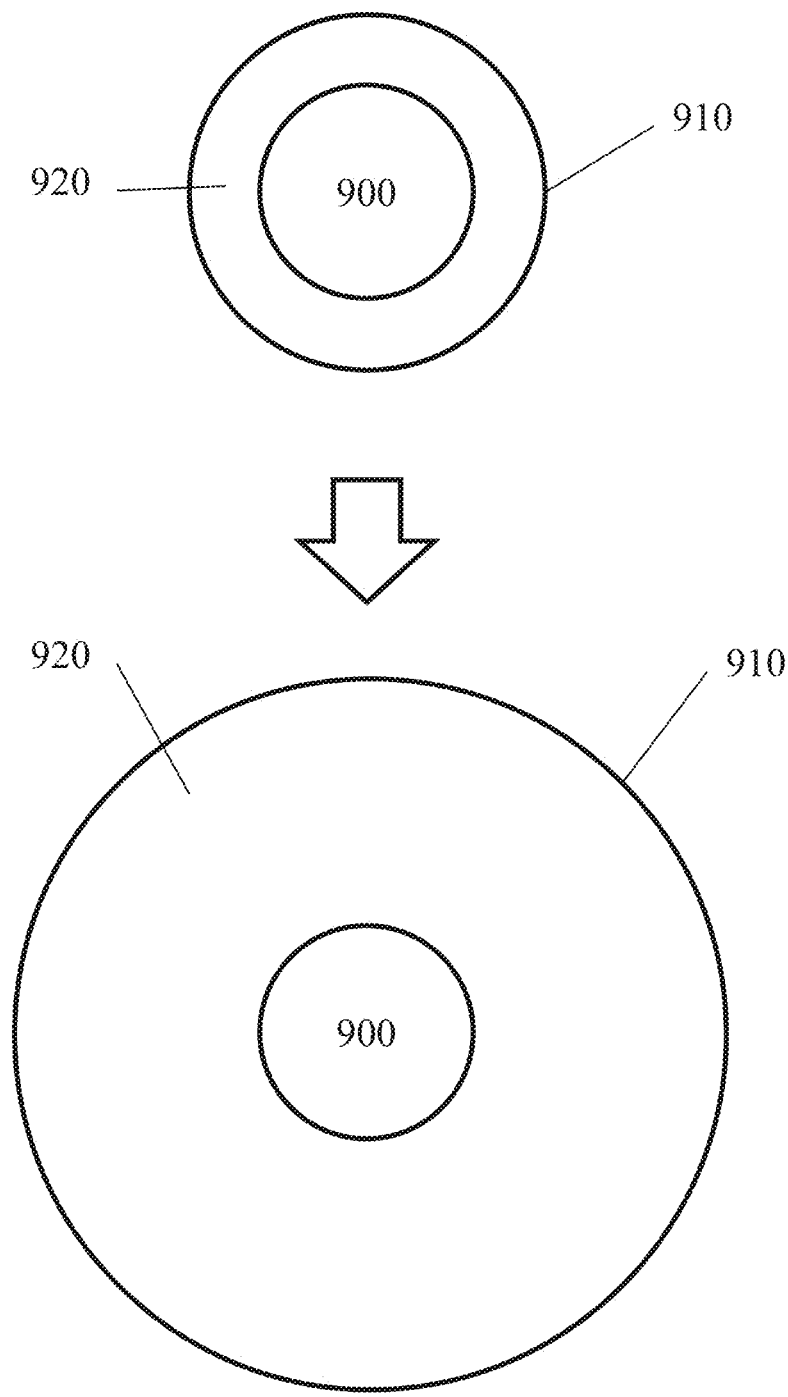
FIG. 9 schematically illustrates a plan view of expandable configurations.

FIG. 9 schematically illustrates a plan view of such a component; the top image shows the more compact configuration, while the lower image shows an expanded configuration. While a cylindrical example is shown, of course any suitable shape may be used.

A core 900 is surrounded by an expandable shell 910. The core 900 may be made of any suitable material, and is used to house any processing and/or control components and the like. For example, the expandable shell 910 may comprise a deformable material, such as elasticated material or the like, a series of overlapping plates, or a spiralled sleeve of plastic of a length exceeding the maximum deployed circumference, or an otherwise controllable surface that is operable to expand (for example, a series of plates that instead expand but leave gaps between the plates, or the spiralled sleeve that partially unfurls and then re-furls as the unit expands).

The volume 920 comprises a mechanism for causing the shell 910 to expand. In some examples, this may be an inflatable bag or the like. In some embodiments, this may be a series of actuators operable to cause expansion of the shell 910, such as by providing a force pushing out from the core 900. A further example is that of an inflatable deformable pipe that could be wound around the core 900, such that when inflated the pipe becomes less tightly wound about the core 900 and instead pushes the shell 910 away from the core 900.

In a number of embodiments, the weight of the apparatus may be considered. In view of this, components with a similar form may be provided that have different weights and/or densities so as to enable a control of the weight. Alternatively, or in addition, the number of internal components may be varied; for instance, when representing a light object the apparatus may comprise only components acting as the external surfaces so as to provide a hollow shape. Conversely, when representing a heavier object the internal volume may be filled with heavy components rather than being left hollow. Some components may be provided with gyroscopes or the like for generating an inertial force. This may be used to simulate a desired weight or weight distribution for an object, and as such may be more effective than simply using components with different weights.

In some embodiments, components may be provided that are operable to provide an arrangement with locomotive capabilities. This may allow the apparatus to move without the user's input, for example to emulate the motion of an object in the media content that is displayed to a user. For example, if the apparatus is used to represent a cup being placed on the table by a character in a game, it may be considered advantageous if the apparatus is able to move to the corresponding position in the real environment to enable to user to interact with it.

In some examples, one or more of the components may be provided with wheels (or be able to act as a wheel, for example if the component is a disc or spherical shape) that may be operated so cause motion. Such wheels may be retractable, so as to enable improved approximation of a desired shape. Any other suitable method for providing motion may be used in addition to or instead of this.

It is also considered that the ability for the components to move may be used in a reconfiguration process for the apparatus. For example, components that are removed from the apparatus may be controlled so as to cause them to move to a predetermined location (such as a defined supply area) ready for future use; similarly, if additional components are required then these may be able to move themselves to the location of the apparatus to be able to be incorporated into the apparatus to generate the desired model.

Figure 10:
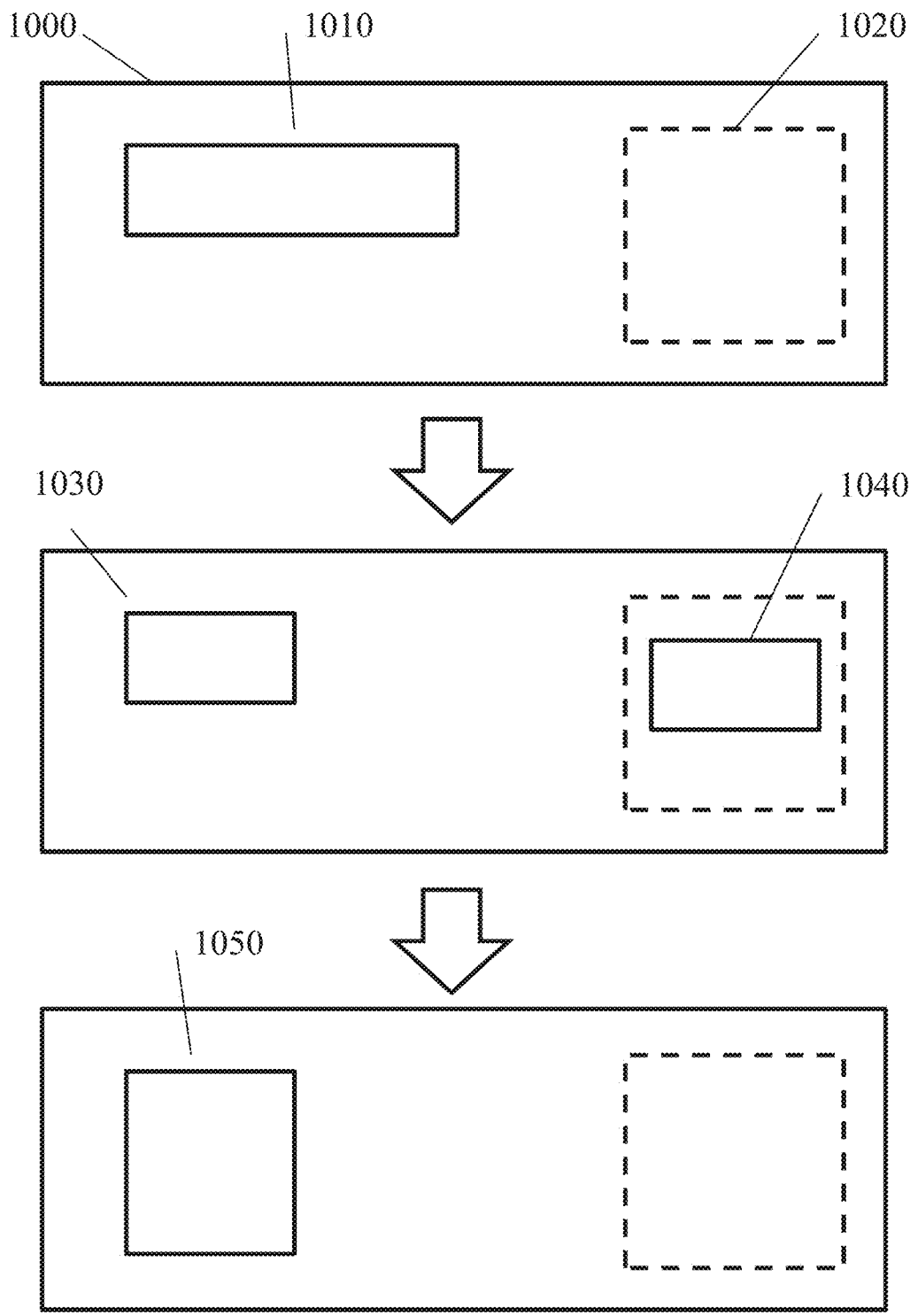
FIG. 10 schematically illustrates an apparatus reconfiguration process.

FIG. 9 provides a schematic illustration of such an arrangement; in FIG. 10, a surface 1000 is provided (such as a tabletop) upon which the apparatus 1010 is present. A supply area 1020 is provided at one end of the surface 1000. Of course, a surface need not be provided, as the apparatus could be handheld or used on the floor for example.

In the first image, a long shape is represented by the apparatus 1010 while the supply area 1020 is empty.

In the second image, a smaller shape is represented by the apparatus; this comprises a first portion 1030 of the components of the apparatus 1010, while a second portion 1040 of the components of the apparatus 1010 has been moved to the supply area 1020.

In the third image, a larger shape 1050 (different to that of the apparatus 1010 in the first image) has been formed using all of the components. This may be achieved by causing the components 1040 to move to the location of the components 1030 (or to cause the components to meet at any other location) and then perform a reconfiguration such that the desired shape 1050 may be formed. This reconfiguration may comprise the use of electromagnetic or other connectors and actuators, for example, as described above.

As noted above, in some embodiments not all of the components are able to move—in such embodiments it is envisaged that those which are able to move may be able to be controlled to gather those which cannot and to move them to the desired location (for example, by forming a temporary connection with them and moving while connected). In this manner, all components may be utilised even if they are not capable of moving themselves.

In order to locate the components, any suitable method may be used; examples include video-based methods (for example, capturing images of the area in which the components are present), using accelerometers or the like to track motion, or by using wireless communication between components and a hub/other components to determine relative positions.

In some embodiments, more than one object may be simulated at a time—for example, the components may be split into two separate groups with each being used to generate an approximation of a different object. In such a case, processing may be performed that generates configurations for each group that provides a suitable trade-off between numbers of components and quality of approximation of the object. This may be advantageous if the number of components is limited, as rather than having two incomplete approximations or one complete and one not (for example), two lower-quality approximations could be generated with the components. Of course, any number of approximations may be generated in such an embodiment.

Figure 11:
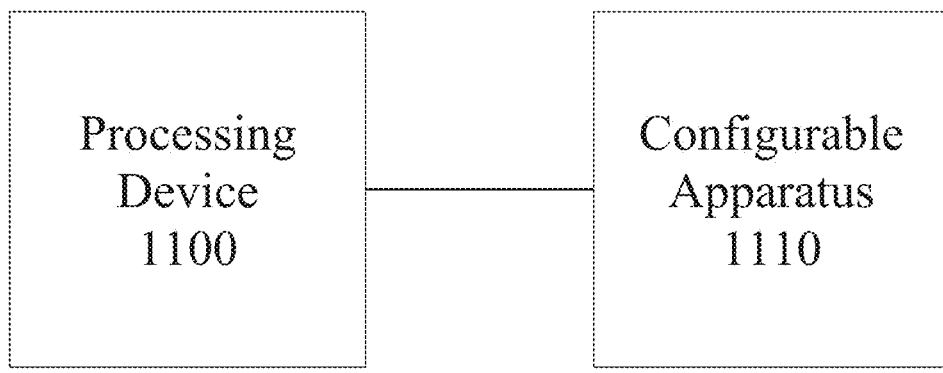
FIG. 11 schematically illustrates a system for providing a configurable apparatus.

FIG. 11 schematically illustrates a system for providing a configurable apparatus. This system comprises a processing device 1100 and a configurable apparatus 1110; while shown as separate units in FIG. 11, they could be formed as a single device.

The function of the processing device 1100 is to generate instructions to control the configurable apparatus 1110. In some embodiments, the processing device 1100 also functions as a media playback device for providing media content (such as video and/or audio content) to a user.

Figure 12:
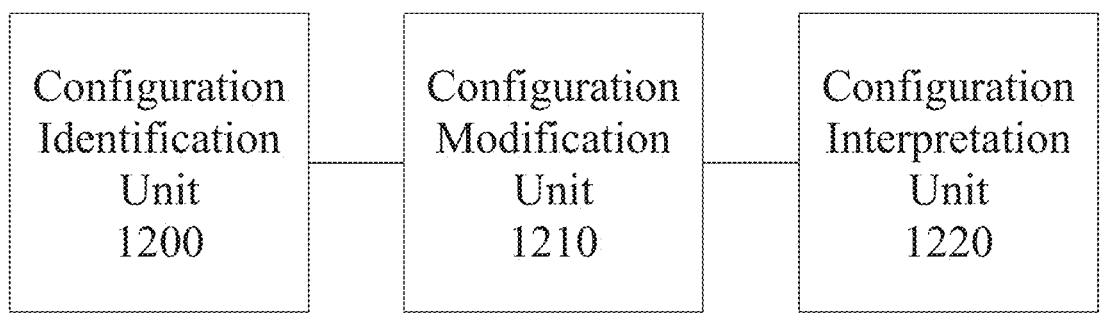
FIG. 12 schematically illustrates a system for controlling a configurable apparatus.

FIG. 12 schematically illustrates a system for controlling a configurable apparatus comprising a plurality of configurable components that are connectable to each other, the system comprising a configuration identification unit 1200, a configuration modification unit 1210 and a configuration interpretation unit 1220. The units 1200, 1210 and 1220 may be distributed in any suitable manner between the processing device 1100 and configurable apparatus 1110, or any number of other devices.

The configuration identification unit 1200 is operable to identify a preferred configuration of the apparatus in response to media content to be provided to a user, the preferred configuration comprising information about the connections between configurable components of the apparatus.

The configuration modification unit 1210 is operable to modify the configuration of the apparatus in dependence upon the identified preferred configuration, wherein different configurations of the apparatus correspond to the shapes of different objects relating to the media content. This feature may be used to enable a user to be able to pick up a peripheral that is substantially the same shape as an object with which they are interacting in a virtual environment.

The configuration interpretation unit 1220 is operable to identify a target configuration for the apparatus (for use by the configuration modification unit 1210) based upon the configuration identified by the configuration identification unit 1200. This may be useful in embodiments in which the apparatus is not able to exactly reproduce the preferred configuration, and so a mapping or conversion may be required that identifies a suitable configuration of the apparatus so as to approximate the preferred configuration. In some embodiments, the configuration interpretation unit 1220 is operable to identify a configuration of the apparatus that approximates a model generated by the configuration identification unit 1100.

Figure 13:
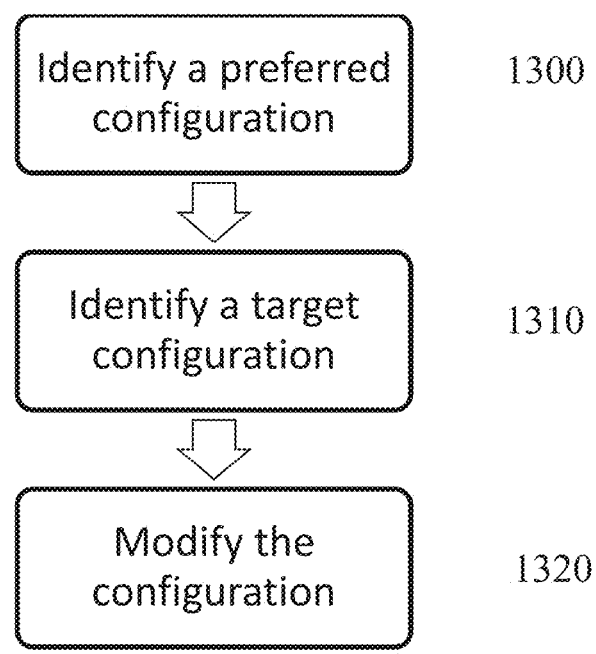
FIG. 13 schematically illustrates a method for controlling a configurable apparatus.

FIG. 13 schematically illustrates a method for controlling a configurable apparatus comprising a plurality of configurable components that are connectable to each other.

A step 1300 comprises identifying a preferred configuration of the apparatus in response to media content to be provided to a user, wherein different configurations of the apparatus correspond to the shapes of different objects relating to the media content and the preferred configuration comprises information about the connections between configurable components of the apparatus.

An optional step 1310 comprises identifying a target configuration for the apparatus based upon the configuration identified in step 1300. In some embodiments, the step 1310 comprises identifying a configuration of the apparatus that approximates a model of the preferred configuration identified in the step 1300.

A step 1320 comprises modifying the configuration of the apparatus in dependence upon the identified preferred configuration, for example by causing the relative arrangement of one or more components to be changed or by adding and/or removing components.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for controlling a configurable apparatus comprising a plurality of configurable components that are connectable to each other, the system comprising:
    a configuration identification unit operable to identify a preferred configuration of the apparatus in response to media content to be provided to a user, the preferred configuration comprising information about the connections between configurable components of the apparatus; and a configuration modification unit operable to modify the configuration of the apparatus in dependence upon the identified preferred configuration, which results in a modified configuration, wherein different configurations of the apparatus correspond to respective shapes of different objects relating to the media content, and wherein an overall shape of the apparatus in the modified configuration corresponds to an overall shape of an identified object, where the configuration identification unit is operable to identify the identified object for interaction by a user within the media content.

2. A system according to claim 1, wherein the configurable components comprise one or more polyhedra.

3. A system according to claim 1, wherein the configuration identification unit is operable to generate a model of the preferred configuration.

4. A system according to claim 3, wherein the configuration identification unit is operable to generate the model in dependence upon metadata associated with the media content.

5. A system according to claim 3, wherein the configuration identification unit is operable to generate the model in dependence upon image analysis performed upon the media content so as to identify at least the dimensions of a virtual object.

6. A system according to claim 3, wherein the configuration identification unit is operable to generate the model in dependence upon received game data relating to an object.

7. A system according to claim 3, comprising a configuration interpretation unit operable to identify a configuration of the apparatus that approximates the generated model, wherein the configuration modification unit is operable to modify the configuration of the apparatus in line with the configuration identified by the configuration interpretation unit.

8. A system according to claim 1, wherein one or more of the plurality of configurable components are reversibly attached to one or more of the other of the plurality of configurable components.

9. A system according to claim 8, wherein the configuration modification unit is operable to cause the apparatus to increase or decrease the number of configurable components.

10. A system according to claim 1, wherein the configuration modification unit is operable to control the or each configurable component to vary in size and/or shape.

11. A system according to claim 1, wherein one or more of the configurable components is operable to move; and the configuration modification unit is operable to control the motion of one or more configurable components as part of the configuration modification.

12. A method for controlling a configurable apparatus comprising a plurality of configurable components that are connectable to each other, the method comprising:

identifying a preferred configuration of the apparatus in response to media content to be provided to a user, the preferred configuration comprising information about the connections between configurable components of the apparatus; and modifying the configuration of the apparatus in dependence upon the identified preferred configuration, which results in a modified configuration, wherein different configurations of the apparatus correspond to respective shapes of different objects relating to the media content, and wherein an overall shape of the apparatus in the modified configuration corresponds to an overall shape of an identified object, where the identifying includes identifying the identified object for interaction by a user within the media content.

13. A non-transitory computer-readable storage medium which stores computer software, which when executed by a computer, causes the computer to carry out actions, comprising:

identifying a preferred configuration of an apparatus in response to media content to be provided to a user, the preferred configuration comprising information about connections between configurable components of the apparatus that are connectable to one another; and modifying the configuration of the apparatus in dependence upon the identified preferred configuration, which results in a modified configuration, wherein different configurations of the apparatus correspond to respective shapes of different objects relating to the media content, and wherein an overall shape of the apparatus in the modified configuration corresponds to an overall shape of an identified object, where the identifying includes identifying the identified object for interaction by a user within the media content.

* * * * *